UNITED STATES PATENT OFFICE.

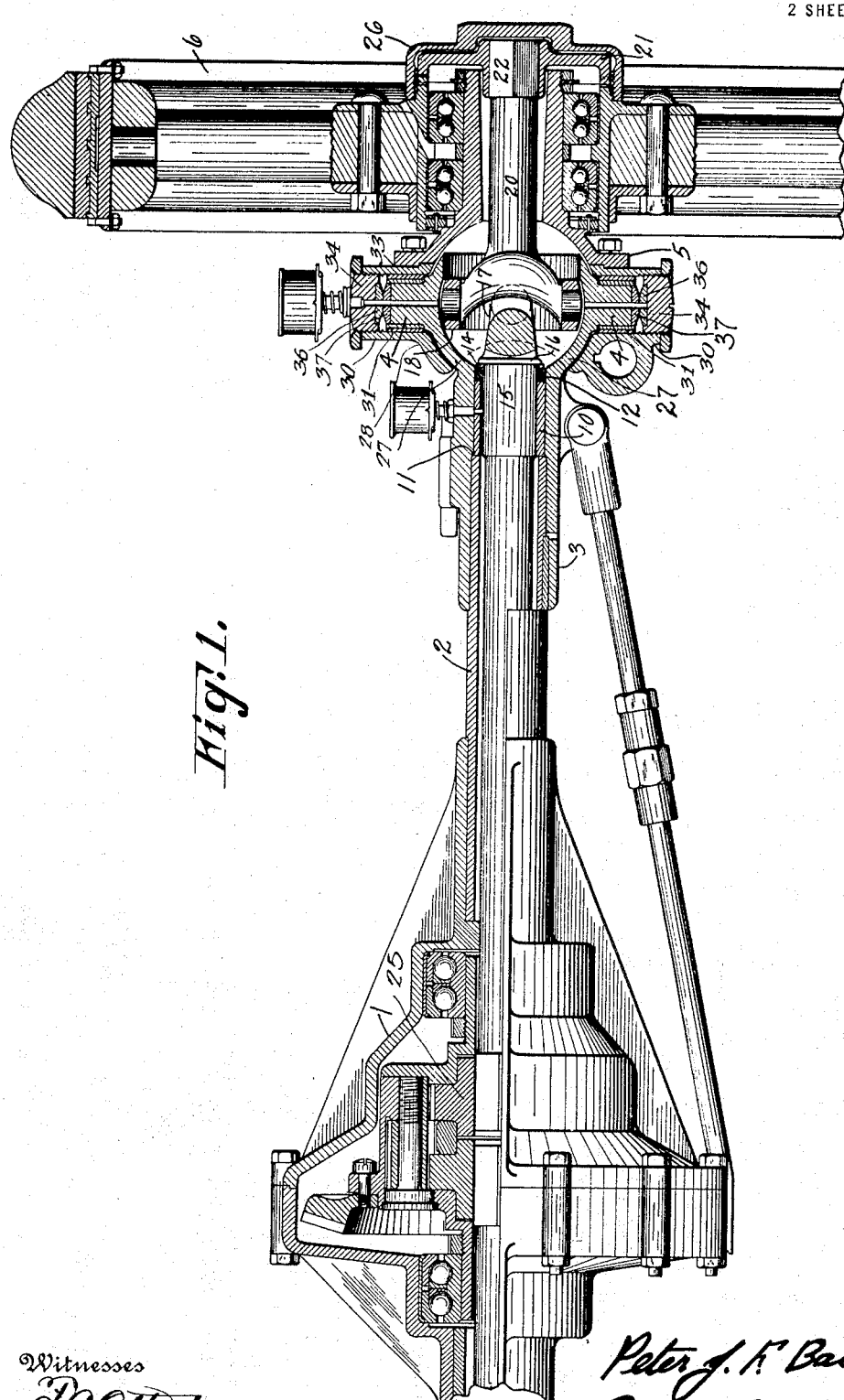

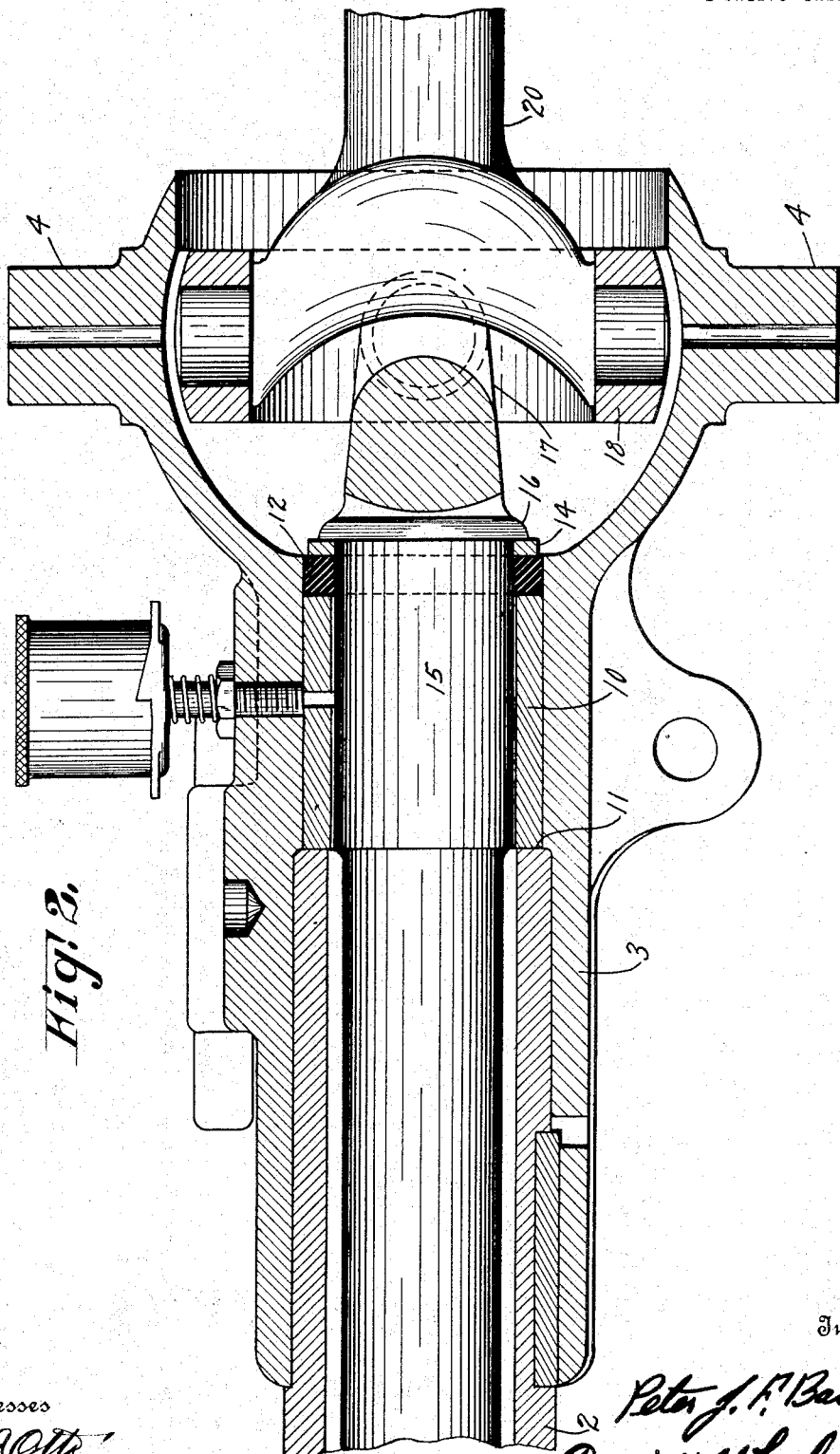

PETER J. F. BATENBURG, OF CLINTONVILLE, WISCONSIN, ASSIGNOR TO FOUR WHEEL DRIVE AUTO CO., OF CLINTONVILLE, WISCONSIN, A CORPORATION OF WISCONSIN.

COMBINED DRIVING AND STEERING MECHANISM FOR MOTOR-DRIVEN VEHICLES.

1,205,965.  Specification of Letters Patent.  Patented Nov. 28, 1916.

Application filed May 1, 1913. Serial No. 764,758.

*To all whom it may concern:*

Be it known that I, PETER J. F. BATENBURG, a subject of Queen Wilhelmina of the Netherlands, residing at Clintonville, county of Waupaca, and State of Wisconsin, have invented new and useful Improvements in Combined Driving and Steering Mechanisms for Motor-Driven Vehicles, of which the following is a specification.

My invention relates to improvements in combined driving and steering mechanisms for motor driven vehicles.

The object of my invention is to provide means for relieving a floating driving axle from the inward thrust pressure of a steering wheel, whereby a universally jointed axle may be held against axial displacement which would otherwise disaline its knuckle joint with the steering axis.

It is essential to the successful operation and durability of a combined driving and steering axle joint that the pivot axes of the steering axle be maintained in perfect alinement with the joint of the universally jointed driving axle. In motor driven vehicles in which the power is applied to all four wheels through driving axle shafts it is essential that the driving axle shaft be universally jointed in the direct line of the steering pivots, and therefore any structure which permits even a slight shifting of either the axle or the steering pivots under the shocks or vibrations imparted by the vehicle wheel will necessarily produce cramping effects which will cause rapid deterioration and eventual destruction of the mechanism. All strains and all wear resulting from the cramping of the parts will necessarily increase the eccentricity or variation from a true alinement of the steering pivot and axle joints, and thus accelerate the disintegration of the structure. It is well known that the desirability of applying the power to all of the wheels of the vehicle increases with the weight of the vehicle and the load which it is to carry, and therefore such structures have principally been employed in connection with motor driven trucks in which the shocks and strains incident to road travel are very heavy and ordinary bearings have been found to be wholly inadequate to meet the requirements of the service.

My invention therefore contemplates absolute rigidity in the steering pivot bearings and perfect alinement of the driving axle joint with the steering pivot axes, also facility in removal and replacement of the wearing parts, with a minimum disorganization or separation of parts which require exact fitting.

In the drawings—Figure 1 is a rear view, part in longitudinal section, of a portion of an axle structure embodying my invention, showing one of the traction wheels with its supporting axle member and driving member and a portion of the differential gearing. Fig. 2 is a detail sectional view on a larger scale, of a portion of one of the members of the supporting axle showing my improved bearing and a driving axle supported therein.

Like parts are identified by the same reference characters in both views.

A supporting axle member is composed of sections 1, 2 and 3, which are rigidly connected with each other, the section 3 being provided with vertically disposed trunnions 4 to which an axle section 5 may be pivotally connected, as shown in Fig. 1, the wheel 6 being mounted upon this axle section. A bearing sleeve or bushing 10 is inserted in the member 3 from its outer end and abuts against the shoulder 11 formed by the outer end of the section 2. This portion of my improved bearing may be of ordinary type, but in addition thereto, I provide a thrust collar 12 which is preferably composed of vulcanized fiber. Said collar seats against the outer end of the bushing 10 and is adapted to receive the thrust pressure of a metal ring, preferably a steel ring 14 which is mounted upon the driving shaft member 15.

The shaft member 15 is provided with an annular ring or projection 16 adjacent to the fork 17 which is pivotally connected with the knuckle joint ring 18. The swinging member 20 of the driving shaft is pivoted to the knuckle joint ring 18 in the usual manner, and is connected with the wheel 6 by a spider 21, which spider is loosely mounted upon the squared extremity 22 of the shaft section 20 so that said spider and shaft may have relative axial movement although adapted for rotative motion transmission. The spider is also loosely connected with the wheel to permit similar relative movement. The shaft section 15 is similarly connected with the driven member 25 of the differential gearing. A cap 26, carried by the wheel, incloses the outer end of the driving shaft and of the spider 21.

The above described construction enables me to employ a floating axle in a structure of this type. The fiber thrust collar 12 receives the inward pressure upon the driving shaft whenever the wheel is subjected to shocks or lateral pressures due to inequalities in the ground or to the turning of the vehicle. Such inward pressures would otherwise move a floating axle inwardly and carry the knuckle joint out of line with the steering axis, thus tending to lock the mechanism if it should be attempted to turn the wheel under such conditions. The desirability of using a floating axle is well known, both for convenience in withdrawing the driving mechanism from the housing or stationary members and also in view of the fact that the driving mechanism is thus relieved from shock. But in a so-called four wheel drive structure, a difficult problem has heretofore been encountered in the fact that the thrust pressures exerted by the wheel would frequently disaline the joint of a floating axle with the axis of the steering post. I have also found that thrust pressures exerted directly upon the bushing 10, tend to produce a bur upon the outer end of such bushing which cuts out the shaft and causes rapid destruction of the parts. By interposing the fiber thrust collar 12, the bushing 10 is protected from injury and a slight cushioning effect is secured which adds greatly to the durability of the machine. At the same time, this thrust bearing effectively prevents an inward movement of the driving shaft.

It will, of course, be understood that outward shocks or pressures of the traction wheel are not transmitted to the driving shaft owing to the loose connection of the spider 21 with the shaft and wheel.

It will be observed that the steering pivot posts 4 are mounted upon a spherically rounded enlargement of the outer end of the axle member 3, whereby these posts are rigidly supported by a spherically curved arch or shell 27. The outer axle section 5 has a similar spherically rounded portion 28 at its inner end which is concentric with the arch or shell carried by member 3, and provided with radially extending bearing sockets 30 to receive the posts 4, removable bushings 31 being preferably interposed. The socket members 30 may be integral, since the joints in the spherically rounded portion 28 of the axle member 5 are so located that they do not intersect these socket members 30, but are at one side of the socket members, as shown, for example, at 33. Further, the socket members are tubular in form and are capped by nuts 34, between which and the pivot posts 4 a set of bearing members 36 and 37 are interposed, these members having spherically rounded meeting faces. The meeting points of these surfaces are directly alined with the axes of the pivot posts and the spherical arches 27 and 28 of the axle members 3 and 5 afford sufficient rigidity to maintain these bearing members in perfect alinement so that no relative shifting of the axis of pivotal oscillation, with reference to the universal joint of the driving axle, is possible. It will, therefore, be obvious that I have provided means for not only avoiding the effects of strains or movement of any kind resulting from shocks of road travel so far as my improved driving and steering joint is concerned, but my improved structure also enables me to quickly replace the parts which are subject to wear with minimum expense and with little loss of time. For example, the floating driving axle may be easily withdrawn by removing a wheel and that portion of the axle member 5 beyond the joint 33 thereof, leaving the steering pivots undisturbed, and yet permitting removal and replacement of the fiber bushing 12 and ring 14. Also that the nuts 34 may be removed to permit the removal and replacement of the bearing members 36 and 37 and also the bushings 31 without disturbing the relation of the bearing sockets to the pivot posts 4. Owing to the rigidity of the spherically rounded concentric shells formed on the meeting ends of the supporting axle members 3 and 5, it is possible to support the entire load upon the bearing members 36 and 37 so that the spherically rounded shells need not be in bearing contact, although constituting bearing members in the sense of furnishing rigid spherically curved arches which adequately support the bearing members 36 and 37 against any possible shifting movements.

I am aware that attempts have been made heretofore to utilize ball bearings to receive the end thrust of the axle members in a structure wherein the power is applied to a vehicle wheel through the steering axis, but it is not possible to maintain ball or roller bearings in such a condition as to prevent material shifting movements, such bearings being useful principally to prevent end thrust wear. They are not adapted to prevent all end thrust movement and are not easily and readily replaced with minimum trouble or expense. I therefore do not regard such roller bearings as equivalents for the fiber thrust collar 12, employed with or without the steel ring 14 herein described, and which collar and ring are not adapted to avoid frictional wearing contact, but are adapted to prevent end thrust movement and are also adapted to operate in coöperation with the spherically arched supporting axle members to preserve the desired perfect alinement of the driving and steering joints. I also attach great importance to the fact that I am able to remove all of the parts subject to direct wear and to replace them frequently with slight loss of time and minimum expense, and this has not been possible in the structures heretofore employed.

I claim—

1. A driving and steering axle structure, comprising the combination of supporting hollow axle members pivotally connected for relative movement about a vertical axis, a longitudinally movable driving axle extending through said members and having a universal joint at said pivotal axis, a bearing bushing for said driving axle, interposed between it and one of the supporting hollow axle members, a collar in end thrust relation to said bushing, and an annular shoulder on the shaft, adapted to exert thrust pressure against said collar.

2. A driving and steering axle structure comprising the combination of supporting hollow axle members pivotally connected for relative movement about a vertical axis, a driving axle extending through said members and having a universal joint at said pivotal axis, a bearing bushing for said driving axle, interposed between it and one of the supporting hollow axle members, and having one end abutting an internal shoulder on one member of the axle, a fiber thrust collar abutting the other end of said bushing with its inner surface in contact with the shaft and its outer surface embraced by said hollow axle member, and an annular shoulder on the driving axle in end thrust relation to the bushing and collar.

3. A driving steering axle structure comprising the combination of supporting hollow axle members pivotally connected for relative movement about a vertical axis, a driving axle extending through said members and having a universal joint at said pivotal axis, a bearing bushing for said driving axle, interposed between it and one of the supporting hollow axle members and having one end abutting an internal shoulder on one supporting axle member, a fiber thrust collar abutting the other end of said bushing and having its inner and outer surfaces in contact with the shaft and hollow axle member respectively, and an annular shoulder on the driving axle in end thrust relation to the bushing and collar, together with a metallic collar interposed between the fiber thrust collar and said shoulder.

4. A driving and steering axle structure, comprising the combination of supporting hollow axle members pivotally connected for relative movement about a vertical steering axis, a wheel mounted upon the outer hollow axle member, a longitudinal movable driving axle extending through said axle members and having connection with the wheel, said driving shaft being universally jointed at the steering axis, a bearing for said driving shaft mounted in the supporting axle member, a shoulder on the driving shaft adjacent to said bearing, and a thrust bearing collar interposed between said shoulder and bearing, substantially as described.

5. A driving and steering axle structure, comprising the combination of supporting hollow axle members pivotally connected for relative movement about a vertical axis, a driving shaft extending through said members and having a universal joint at said pivotal axis, a bearing bushing for said shaft interposed between it and one of the supporting hollow axle members, a collar in end thrust relation to said bushing, an annular shoulder on the shaft adapted to exert thrust pressure against said collar, and means for separating the supporting hollow axle members and removing the outer end portion thereof without disturbing said pivotal connections, whereby access is afforded for the removal and replacement of said thrust collar when the driving axle is removed.

6. A driving and steering axle structure, comprising the combination of supporting hollow axle members pivotally connected for relative movement about a vertical axis, and spherically arched in the pivotally connected portions to provide rigid support for said pivotal connections, a driving axle extending through said members and having a universal joint at said pivotal axis, a bearing bushing for said driving axle interposed between it and one of the supporting hollow axle members, a removable collar in end thrust relation to said bushing, and an annular shoulder on the driving axle adapted to exert thrust pressure against said collar, the outer supporting axle member being adapted to receive a vehicle wheel and having its spherically rounded portion jointed on the outer side of the pivot bearings, whereby the wheel supporting portion of said axle member may be removed without disturbing the pivot bearings to permit the removal of the driving shaft and thrust collar.

7. In a driving and steering axle structure, the combination of a set of supporting axle members, one of which includes a portion constituting an axle skein adapted to receive a wheel, the inner end of said member being spherically rounded and provided with sockets having vertically disposed axes adapted to receive pivot posts carried by the other supporting axle member, removable cap nuts for said sockets, pivot posts carried by said other axle member and adapted to be received in said sockets, and sets of bearing members interposed between the cap nuts and the ends of the pivot posts and supporting the spherically rounded portion of the skein member from the ends of the post, said cap nuts being adapted to afford access to said bearing members, whereby the latter may be removed and replaced.

In testimony whereof I affix my signature in the presence of two witnesses.

PETER J. F. BATENBURG.

Witnesses:
  W. A. OLEN,
  VALBERG M. OLEN.